（12）United States Patent
Vonmetz et al.

(10) Patent No.: US 7,956,340 B2
(45) Date of Patent: Jun. 7, 2011

(54) LIGHT CONCENTRATOR FOR AN OPTICAL CODE READER

(75) Inventors: Kurt Vonmetz, Bologna (IT); Stefano Ciabattoni, Ozzano dell'Emilia (IT)

(73) Assignee: Datalogic Automation S.r.l., Lippo di Calderara di Reno (BO) (IT)

( * ) Notice: Subject to any disclaimer, the term of this patent is extended or adjusted under 35 U.S.C. 154(b) by 204 days.

(21) Appl. No.: 12/065,710

(22) PCT Filed: Sep. 4, 2006

(86) PCT No.: PCT/EP2006/008609
§ 371 (c)(1),
(2), (4) Date: Mar. 4, 2008

(87) PCT Pub. No.: WO2007/028562
PCT Pub. Date: Mar. 15, 2007

(65) Prior Publication Data
US 2008/0245982 A1    Oct. 9, 2008

(30) Foreign Application Priority Data

Sep. 5, 2005  (EP) .................................... 05425619

(51) Int. Cl.
*G06K 7/10*    (2006.01)
(52) U.S. Cl. ... 250/566; 250/221; 235/454; 235/462.32; 235/462.35
(58) Field of Classification Search .................. 250/216, 250/239, 221, 227.11, 566; 235/454, 462.32, 235/462.35, 462.36
See application file for complete search history.

(56) References Cited

U.S. PATENT DOCUMENTS

| 5,357,101 | A |   | 10/1994 | Plesko |
| 5,530,940 | A | * | 6/1996 | Ludwig et al. .................. 385/31 |
| 5,671,004 | A |   | 9/1997 | Morizumi |
| 2002/0050519 | A1 | * | 5/2002 | Oliva et al. .................... 235/454 |
| 2004/0094696 | A1 |   | 5/2004 | Ramirez-Iniguez et al. |

FOREIGN PATENT DOCUMENTS

| EP | 1207489 | 5/2002 |
| JP | 2002-196273 A | 7/2002 |
| JP | 2004-508733 A | 3/2004 |
| JP | 2002-007981 A | 10/2008 |

(Continued)

OTHER PUBLICATIONS

PCT/EP2006/008609, International Search Report and Written Opinion, Apr. 2, 2007.

(Continued)

*Primary Examiner* — Kevin Pyo
(74) *Attorney, Agent, or Firm* — Duane Morris LLP

(57) ABSTRACT

An optical receiving device (31) for an optical code reader is described, comprising a solid body, of a transparent material, having a light input face (32), a light output face (33) for coupling with a photodetector device (30), said output face (33) being substantially perpendicular to said input face (32), and an oblique face (34) with respect to both said input face (32) and said output face (34), characterized in that the mutual orientation of the faces (32-38, 40-42, 40', 41', 42') of the optical receiving device (31) is such that the light entering from said input face (32) within a desired field of view is concentrated onto said output face (33) by total internal reflection.

38 Claims, 13 Drawing Sheets

FOREIGN PATENT DOCUMENTS

JP          2004-127220 A      10/2008

OTHER PUBLICATIONS

Figure 1:
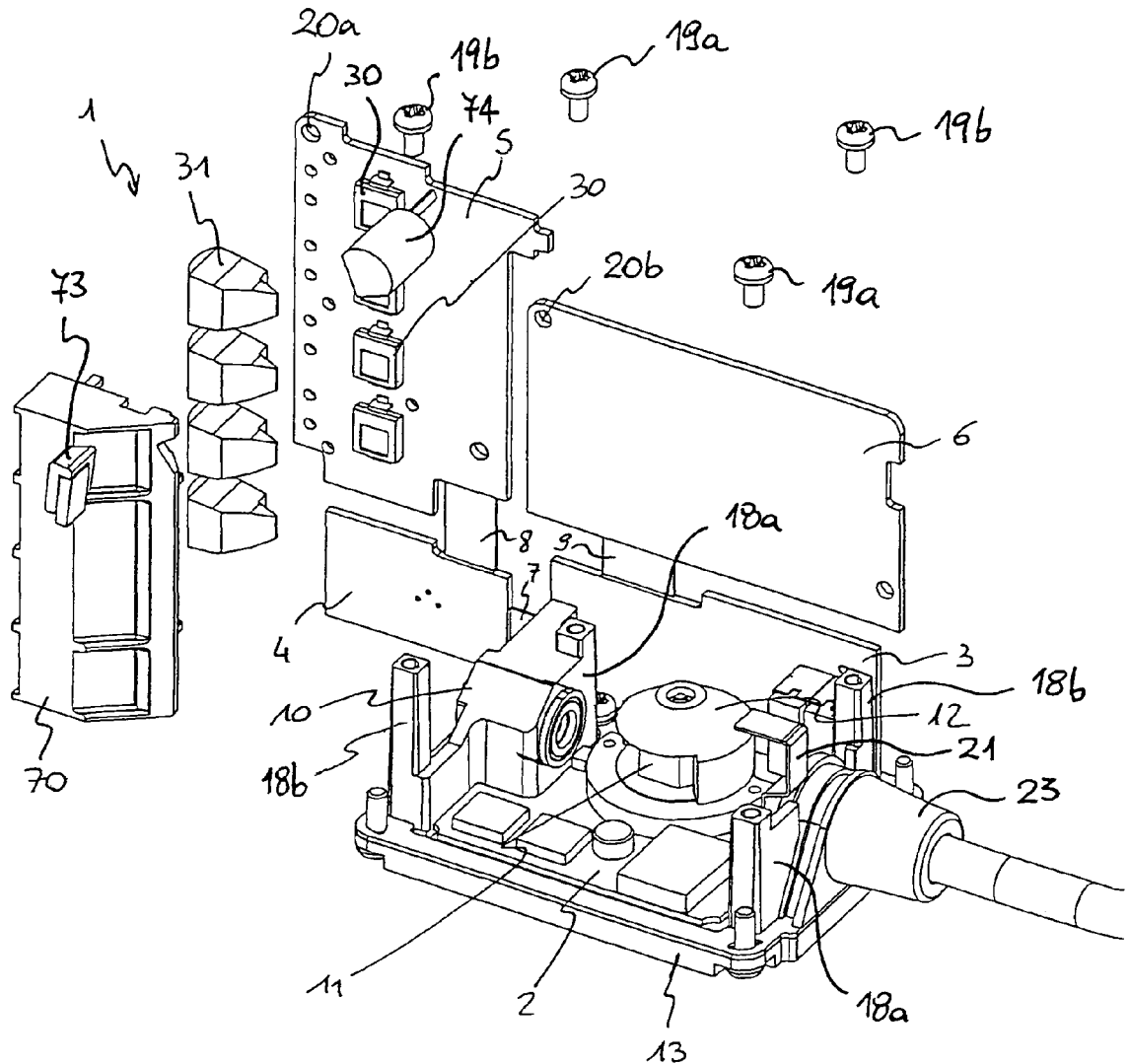

W.T. Welford and R. Winston, High Collection Nonimaging Optics, 1989, Academics Press.

Ning, Xiaohui, Winston, Roland and O'Gallagher, Joseph, Dielectric Totally Internally Reflecting Concentrators, Applied Optics, vol. 26, No. 2, Jan. 15, 1987.

Office Action issued on Sep. 2, 2008 in corresponding Japanese patent application No. 2008-528434.

* cited by examiner

LIGHT CONCENTRATOR FOR AN OPTICAL CODE READER

The present invention concerns an optical receiving device for an optical code, in particular barcode reader, as well as a receiving section and an optical code reader containing it.

As known, in an optical code, in particular black and white or colour barcode reader, a beam of collimated light (not necessarily in the visible range), like for example a laser light beam or the beam of a non-collimated light source, collimated through suitable collimation optics, is moved in a plane, called scanning plane, so as to form a scanning line that crosses the optical code. The light diffused by the optical code when it is illuminated by the scanning line is detected by a photodetector device, which transforms it into a time changing electrical signal whose intensity represents the elements of the optical code, for example the bars and the spaces in the case of barcodes.

The quality of the electrical signal—and therefore the ability to discriminate the elements of the optical code to proceed with its decoding—depends upon the magnitude of the optical signal, i.e. upon the intensity of the light incident on the photodetector device, as well as upon the signal/noise ratio, where under noise the light not coming from the optical code scanning is meant, generally called ambient light.

The photodetector device typically has receiving optics associated therewith, that has the purpose of increasing the amount of light diffused by the optical code and collected by the photodetector device at the same time avoiding the detection of ambient light.

Known solutions typically provide for reducing the solid angle subtended by the photodetector device by increasing its distance from the input opening of the receiving optics, to reduce the field of view of the reader to an as narrow as possible area around the scanning line in order to reduce the noise, and to increase the light collection area, in other words the input opening of the receiving optics, to collect a stronger optical signal. Under field of view the region "optically subtended" by the photodetector device through the receiving optics is meant, i.e. the region from which the photodetector element receives light through the receiving optics.

Both of the provisions of known solutions, however, involve an increase in size of the receiving section of the reader, which is not very well suited for making highly miniaturized readers. Moreover, the size of the sensitive surface of the photodetector device affects the pass band of the electronic receiving circuit. An increase in the sensitive surface involves a reduction in pass band and therefore a reduction in maximum reading speed.

W. T. Welford, R. Winston, "*High Collection Nonimaging Optics*", 1989, Academic Press, Inc., paragraphs 4.3 and 4.4 describes, amongst other "non imaging" light collectors, a Compound Parabolic Concentrator or CPC comprising a reflective surface that defines a light input opening and a light output opening and that, in the three-dimensional case (3D), is obtained from the rotation about an axis (axis of the CPC) of a portion of parabola. With reference to the longitudinal section of FIG. 24, the portion of parabola generating the reflective surface R has the focus F at the edge of the light output opening $A_{out}$ and the axis A forming an angle $\theta_{in}$ with the axis X of the CPC, equal to the desired light acceptance angle. Under "acceptance angle" the maximum angle formed with the axis X of the CPC by the light rays that are reflected by the reflective surface R on the output opening $A_{out}$ is meant. Indeed, in the geometric conditions outlined above, the light entering from the input opening $A_{in}$ with angles smaller than the acceptance angle $\theta_{in}$ is practically completely reflected within the output opening $A_{out}$, and the light entering from the input opening $A_{in}$ with angles greater than the acceptance angle $\theta_{in}$ is practically completely reflected back and out of the input opening $A_{in}$. The concentration ratio of a CPC, defined as ratio between the area of the input light beam and the area of the output light beam, is equal in the two-dimensional case (2D), and very close in the 3D case, to the theoretical maximum concentration ratio, given by the ratio between the area of the input opening $A_{in}$ and the area of the output opening $A_{out}$. The CPC in the 2D case is shaped like a trough whose section corresponds to that just described.

Figure 25:
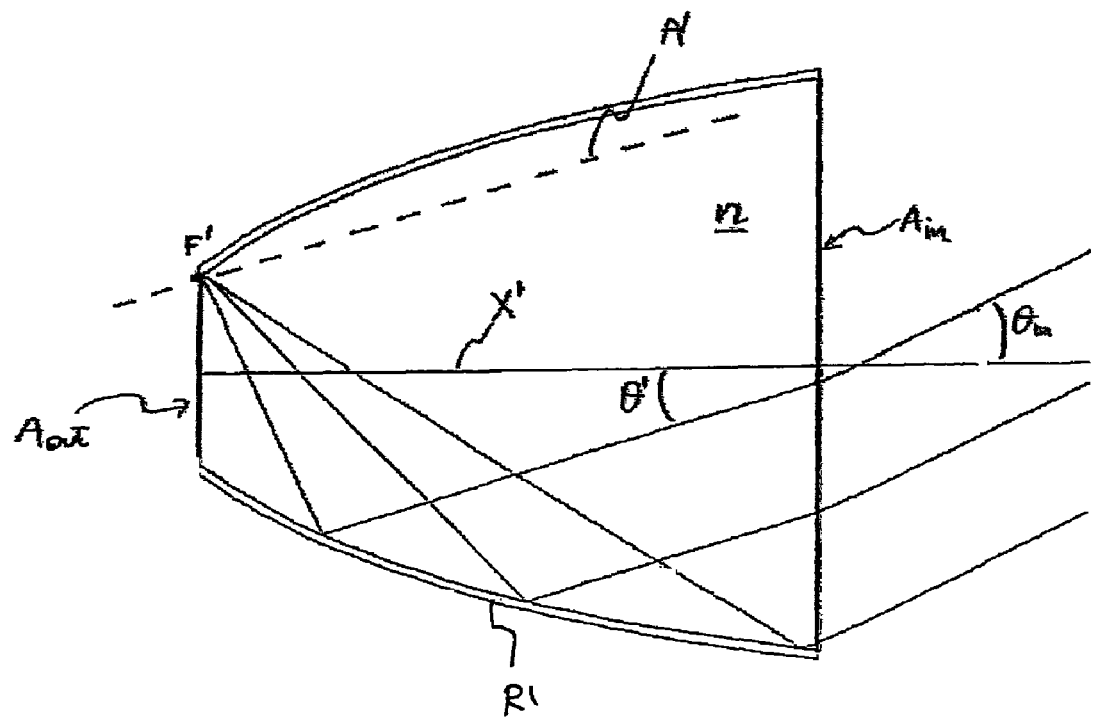

The aforementioned text, paragraph 5.2, also describes a CPC having geometry similar to that described above, which exploits the principle of Total Internal Reflection (TIR). Such a CPC, the longitudinal section of which is shown in FIG. 25, consists of a solid body, of a transparent material having a refractive index n. The light incident on the input opening $A_{in}$ is there refracted in the CPC according to Snell's law, according to which the angle of the refracted ray is correlated to the angle of the incident ray and to the refractive index of the material of the CPC by the relationship $\theta_r = \sin^{-1}((\sin \theta_i)/n)$, for a CPC in contact with air, which has a unit refractive index. The light refracted in the CPC is internally reflected by the parabolic surface R' of the CPC if it forms with the normal thereto an angle greater than the critical angle, given by the expression $\theta_c = \sin^{-1}(1/n)$ for a CPC in contact with air. To take the refraction at the input opening $A_{in}$ into account, the slope of the axis A' of the portion of the generating parabola with respect to the axis X' of the CPC must be of an angle $\theta' = \sin^{-1}((\sin \theta_{in})/n)$.

Also in the case of a solid CPC, exploiting TIR, the concentrator has a very high concentration ratio within the angle of view, which is equal to twice the acceptance angle $\theta_{in}$, while the light transmission from the input opening $A_{in}$ to the output opening $A_{out}$ for light incident beyond the angle of view rapidly decreases to zero.

Figure 24:
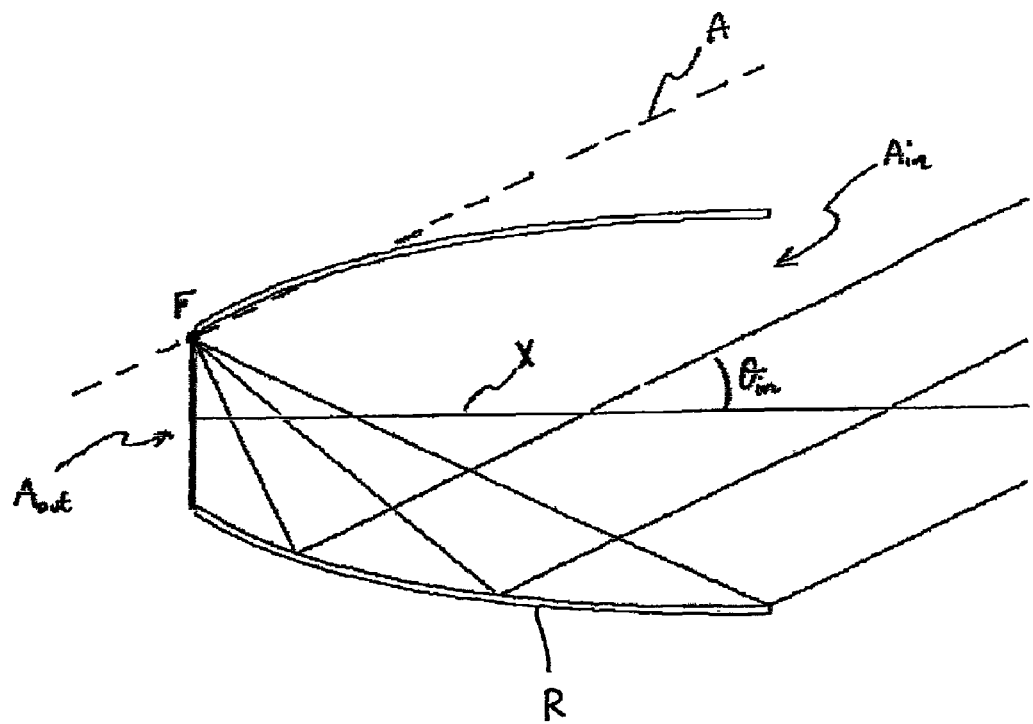

As can be seen from the comparison between FIGS. 24 and 25, with a same size of the CPC along the axis X, X' and with a same size of the output opening $A_{out}$, the size of the input opening $A_{in}$ in the case of a solid CPC, of a material with a refractive index n (FIG. 25), is larger, and precisely by a factor n in the 2D case and by a factor $n^2$ in the 3D case, than to the size of the input opening $A_{in}$ in the case of a hollow CPC with a reflective surface (FIG. 24).

From the opposite point of view, for the same input opening $A_{in}$, the size of the output opening $A_{out}$ in the case of a solid CPC is smaller by a factor equal to the refractive index n or to its square, in 2D and 3D cases respectively, than the case of a hollow CPC.

U.S. Pat. No. 5,357,101 discloses a 3D CPC as described above used as receiving optics in a barcode reader. The 3D CPC has a symmetry of rotation about its longitudinal axis and therefore a field of view with circular section, which is unsuitable for re-ejecting the ambient light in reading optical codes, where the field of view must be as elongated as possible to cover all of and only the scanning line.

EP 1 207 489 A2, on which the preamble of the main claim is based, describes a wedge-shaped receiving chamber for a scanning module, comprising a solid body, of a transparent material, having a front face to face an optical code, an upper or lower face perpendicular thereto at which a photodetector device is arranged, a sloping face between the front face and the upper or lower face, on which a reflecting surface is foreseen, and substantially right-angle triangle shaped side faces, converging away from the front face and on which a reflecting surface can be provided.

Such a receiving chamber requires that a mirror treatment of the oblique wall and possibly of the side walls be made. The function of the wedge-shape is that of bending the optical path of the rays by 90° so as to be able to arrange the photodetector device in a plane perpendicular to the light entry window, but no light-concentration function is described which, if present, is in any case limited. Indeed, a large photodetector device is used, with consequent reduced pass band of the receiving circuit and reduced maximum reading speed. Finally, since the package of the photodetector device projects inside the receiving chamber, some of the light rays that enter from the front face of the receiving chamber strike the package instead of the sensitive surface.

The technical problem at the basis of the present invention is to provide an optical receiving device for an optical code reader that is particularly efficient in maximizing the light collected from the optical code and in re-ejecting the ambient light, while still remaining small in size and allowing the arrangement of an associated photodetector device in a plane substantially parallel to the scanning plane.

In a first aspect thereof, the invention concerns an optical receiving device for an optical code reader, comprising a solid body, of a transparent material, having a light input face, a light output face at least one portion of which is for coupling with a photodetector device, said output face being substantially perpendicular to said input face, and an oblique face with respect to both said input face and said output face, characterized in that the mutual orientation of the faces of the optical receiving device is such that the light entering from said input face within a desired field of view is concentrated onto said output face by total internal reflection.

The provisions according to the invention allow a particularly efficient concentrator to be made, wherein the output face, namely the surface for coupling with the photodetector device, is particularly small in size, and thus allows the use of an equally small photodetector device, with a consequent large pass band of the receiving circuit and thus high-speed or high-frequency reading capability. Moreover, the provisions according to the invention allow easy manufacture of the optical receiving device, preferably through injection moulding, without the need for mirror treatment of the walls of the receiving chamber.

Preferably, the acceptance angle of the optical receiving device in the direction of the scanning line is much greater than the acceptance angle in the direction perpendicular to the scanning line.

In particular, the input face is rectangular or square. In such a way, the field of view of the output face, and therefore of the associated photodetector device, is suitable for reading optical codes through a scanning line.

Preferably, moreover, a focusing lens is integrally made at the input face.

In such a way not only the manufacturing process is simplified, since the lens is co-moulded with the device, but the correct positioning of the lens with respect to the output surface where the photodetector device is arranged is also ensured.

More preferably, said lens is a cylindrical lens, a Fresnel lens or a toric lens.

Such types of lenses provide a field of view that is wide in one direction and narrow in the perpendicular direction, particularly suitable for reading optical codes through a scanning line since it minimizes the ambient light detected and therefore maximizes the signal/noise (S/N) ratio.

More specifically, said input face is preferably cylindrical with a radius of curvature smaller than 5 mm, preferably equal to 4 mm, axis parallel to the scanning plane and substantially square section, preferably of a width substantially equal to 5 mm.

Typically, the transparent material is polycarbonate or an acrylic material, preferably PMMA.

Such materials have a relatively high refractive index, of about 1.5, and therefore allow the area of the output face to be reduced roughly by such a factor with respect to an optical receiving device of a corresponding shape, but made hollow with mirror-type surfaces.

Preferably, positioning and assembly elements of the optical receiving device in the reader, such as projecting pins, grooves or fins, are integrally made in the solid body.

In such a way, the correct positioning of the optical receiving device in the reader is ensured, in particular through the simple engagement of its pins in holes of a Printed Circuit Board (PCB) of the reader.

Preferably, the body of the optical receiving device comprises two side faces substantially perpendicular to said input and output faces, the section in a plane substantially parallel to the output face of each of the side faces being a portion of parabola.

In this way it is possible to exploit to the maximum the concentration capabilities of the optical receiving device.

In an alternative that is less optically efficient, but that simplifies the production of a mould for manufacturing the optical receiving device, the body of the optical receiving device comprises a plurality of flat faces, arranged so as to approach two side faces substantially perpendicular to said input and output faces, the section in a plane substantially parallel to the output face of each of said approaching side faces being a portion of parabola.

More specifically, the body of the optical receiving device comprises a first pair of faces adjacent to the input face and inclined with respect to the normal to the input face by an angle greater than 4° and preferably of about 5°, a second pair of faces, adjacent to the first pair of faces and inclined with respect to the normal to the input face by an angle greater than 9° and preferably of about 10°, and a third pair of faces, adjacent to the second pair of faces and inclined with respect to the normal to the input face by an angle greater than 15° and preferably of about 20°.

Preferably, the body of the optical receiving device further comprises a face substantially opposite the output face, arranged between said input face and said oblique face.

Said face substantially opposite the output face can be inclined preferably by less than 4° and more preferably by about 2° with respect thereto to make it easier to extract the optical receiving device from the mould.

Advantageously the axis of each of said portions of parabola is inclined with respect to the normal to the input face by an angle $\theta'=\sin^{-1}((\sin\theta_\parallel)/n)$, wherein $\theta_\parallel$ represents the desired light acceptance angle in the scanning direction and n the refractive index of said transparent material, and the focus of each of said portions of parabola is at the edge of the opposite side face, on the side opposite to the input face.

The inclination of said oblique face with respect to said output face is preferably less than 45°, more preferably it is about 40°.

Since the plastic materials that can be used as the transparent material have a refractive index of about 1.5 and therefore a critical angle of about 40°, the aforementioned inclination of the oblique face ensures that the light entering from the input face within the desired field of view is internally reflected by the oblique face, also considering the concentration effect of the focusing lens made at the input face.

Preferably, the projection of said oblique face on said input face extends, in the direction perpendicular to the output face, only for a portion of said input face. In such a way, it is avoided that the light rays outside the desired acceptance angle in the direction perpendicular to the scanning line strike the oblique face and are deflected on the output face, thus increasing the efficiency of the optical receiving device.

Similarly, the projection of said oblique face on said output face can extend, in the direction perpendicular to the input face, beyond said output face.

Through such a provision it is possible to increase the efficiency of the optical receiving device by avoiding that a part of light rays outside the desired acceptance angle in the direction perpendicular to the scanning line, even if striking the oblique face, are deflected on the output face.

In an embodiment, said output face is cantilever from a face parallel to said input face.

In such a way, the optical receiving device can receive the photodetector device in the recess thus formed, thus minimizing the bulk of the optical receiving device/photodetector device assembly in the reader.

When such a provision is carried out together with the provision of a cylindrical lens at the input face, the recess does not block the path towards the output face of the light within the desired field of view, but rather on the contrary it advantageously blocks the path of the light outside the desired field of view.

In an alternative embodiment, particularly suitable for a photodetector device that is very thin or recessed into a support of the reader, in particular into a PCB, the output face is at level with an end of the input face.

The transparent material can be coloured so that the optical receiving device simultaneously accomplishes an optical long-pass or band-pass filter, preferably a filter having a pass band of 580-700 nm, suitable for a working wavelength in the red light field (630-670 nm), as is typical for optical code readers.

Preferably, at the input and oblique faces the finish is of an optical quality (optically polished), preferably with roughness of less than 2 μm, while at the output face the finish is of high quality (high polished), preferably with roughness of less than 10 μm.

In a second aspect thereof, the invention concerns a receiving section of an optical code reader, comprising at least one optical receiving device as described above, associated with a photodetector device at the output face.

Preferably, the optical receiving device and the photodetector device are joined through an index matching adhesive.

The index matching adhesive allows reflection losses to be avoided at the optical receiving device—air and air—photodetector device interfaces.

Preferably, the receiving section comprises a plurality of optical receiving devices, each associated with a photodetector device.

By providing for a plurality of photodetector devices, it is possible to increase the amount of light diffused by the code that is overall collected by the receiving section.

The number of modules formed of an optical receiving device and a photodetector device shall be selected taking the opposite requirements of minimizing the bulk of the receiving section and of maximizing the total signal into account.

The receiving section preferably comprises a screen of said at least one optical receiving device, to screen the latter and the photodetector device from ambient light and in particular from the light emitted by the emission and scanning section of the reader.

In such a way the S/N ratio of the associated photodetector device is increased, and an undesired increase in the field of view of the photodetector device is avoided, especially in the case of close-up reading of the optical code.

In case there is a plurality of optical receiving devices, the screen is preferably common to said plurality of optical receiving devices.

In such a case the screen preferably comprises walls extending between pairs of adjacent optical receiving devices, to screen the optical receiving devices and the photodetector devices associated therewith from each other.

To preserve the TIR properties, said screen is spaced from said at least one optical receiving element.

Also for such a purpose, positioning and assembly elements in the reader, such as projecting pins, fins or grooves, can be integrally made in the screen.

Advantageously, moreover, said screen extends beyond the input face of said at least one optical receiving device to house a filter, preferably an optical long-pass or band-pass filter.

Preferably, said screen is made of plastic or thin opaque, for example black or anodized, metal plate.

Since the screen is metallic, it can advantageously be welded directly to a PCB, minimizing the bulk and the cost.

Advantageously, moreover, the screen carries a mirror deflecting a non-useful scanning portion representative of the passage between two successive scanning lines onto an associated sensor.

Advantageously, moreover, the mirror projects in a scanning section of the reader, so that the receiving section and the scanning section partially interpenetrate, allowing the size of the reader to be reduced in the direction perpendicular to the scanning line.

Alternatively, the screen can carry a sensor of a non-useful scanning portion representative of the passage between two successive scanning lines.

In a third aspect thereof, the invention concerns an optical code reader comprising at least one optical receiving element as described above.

Figure 2:
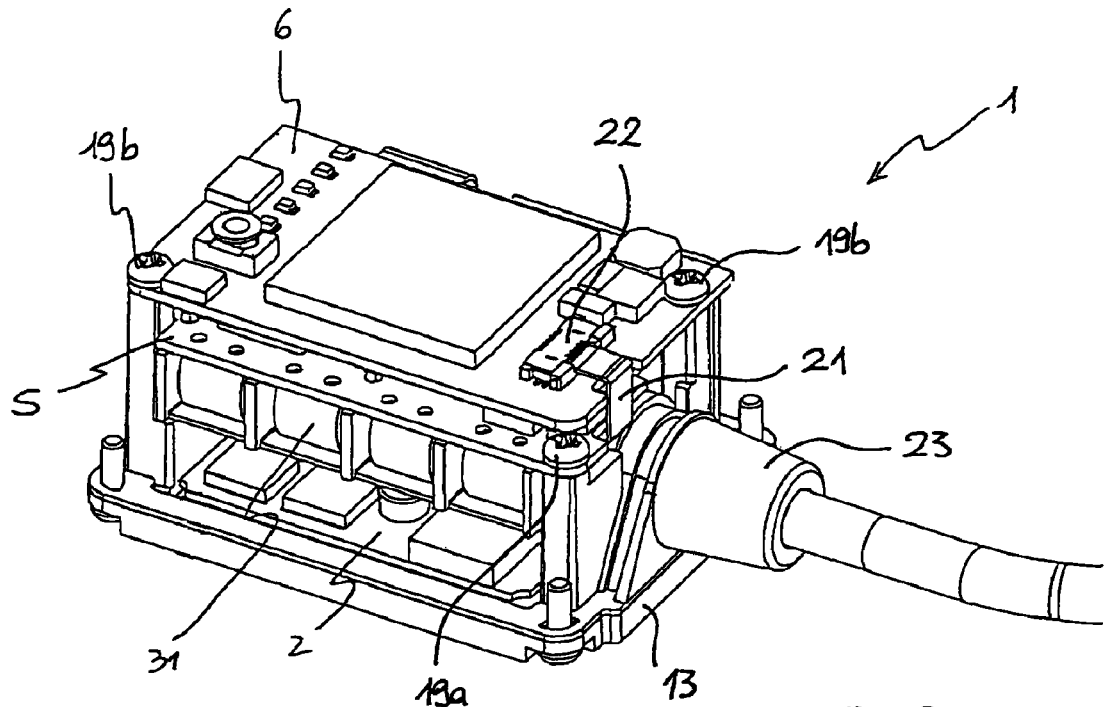
Figure 3:
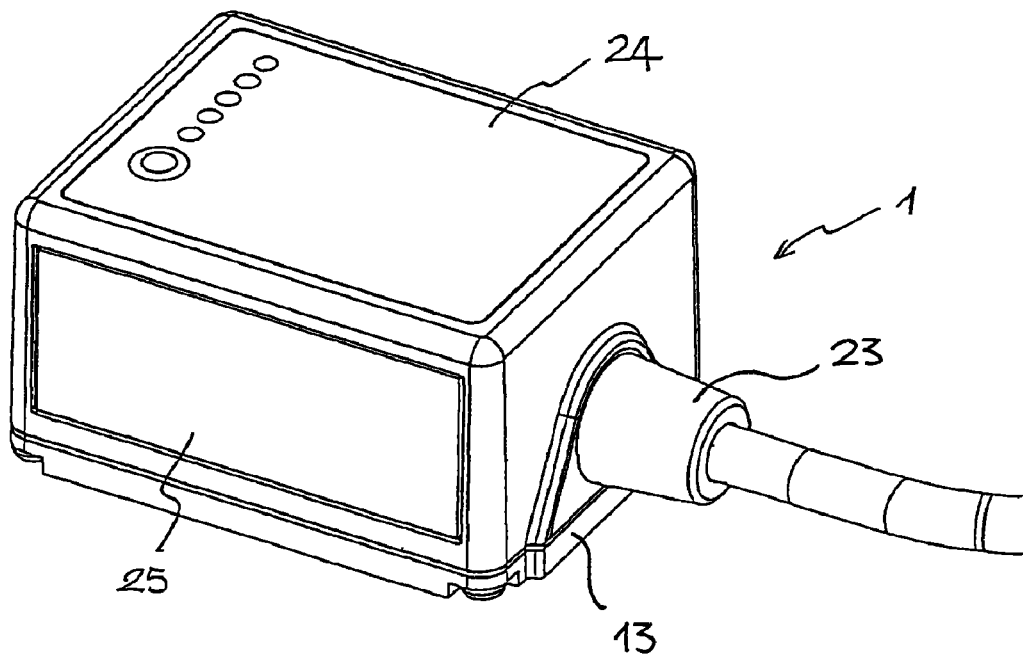
Figure 4:
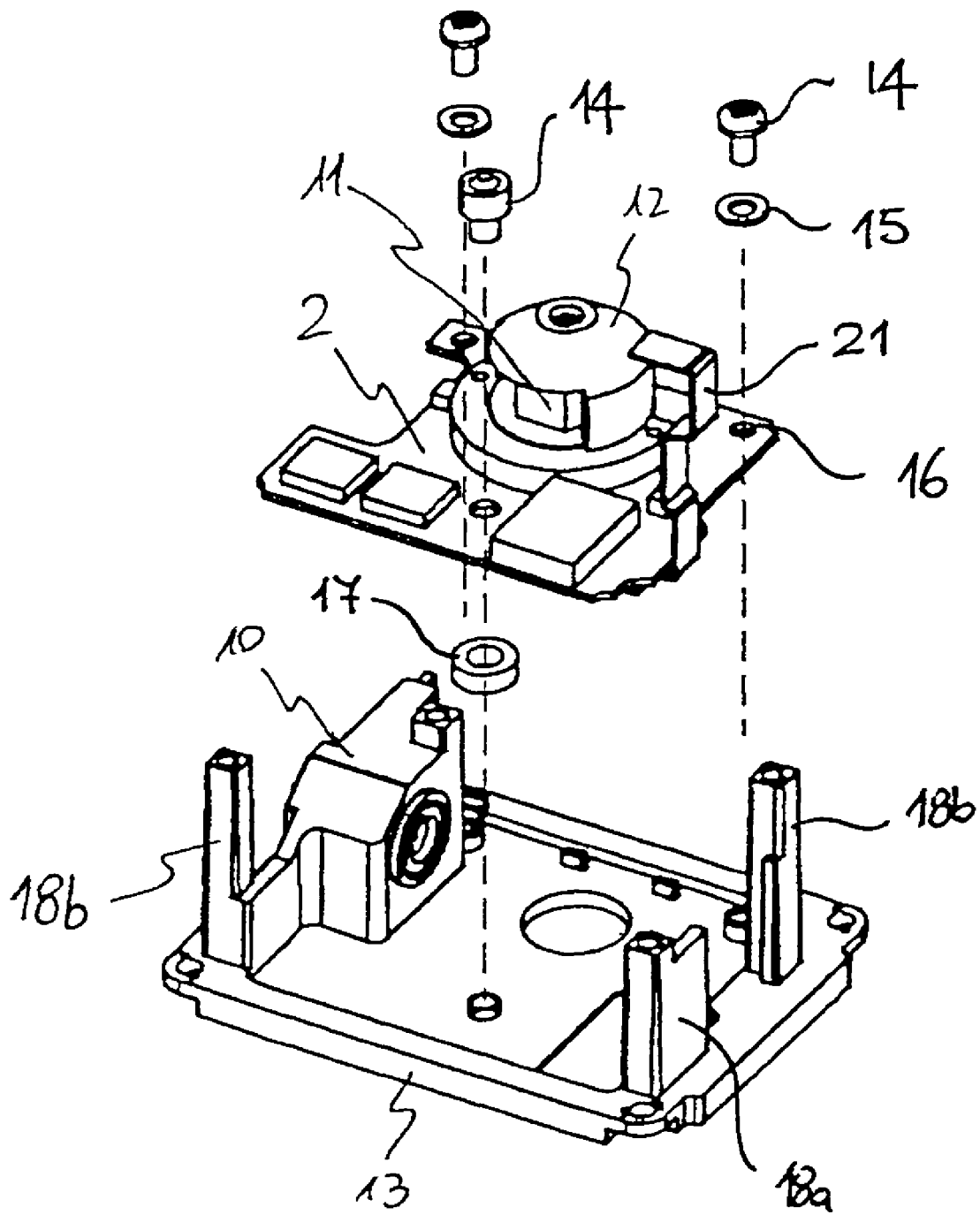
Figure 5:
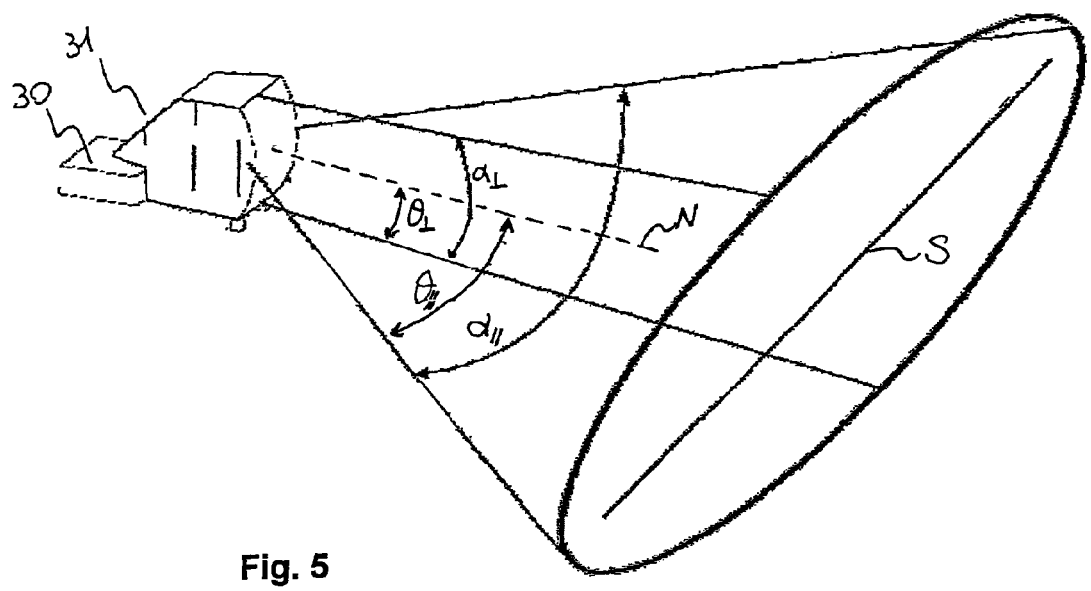
Figure 6:
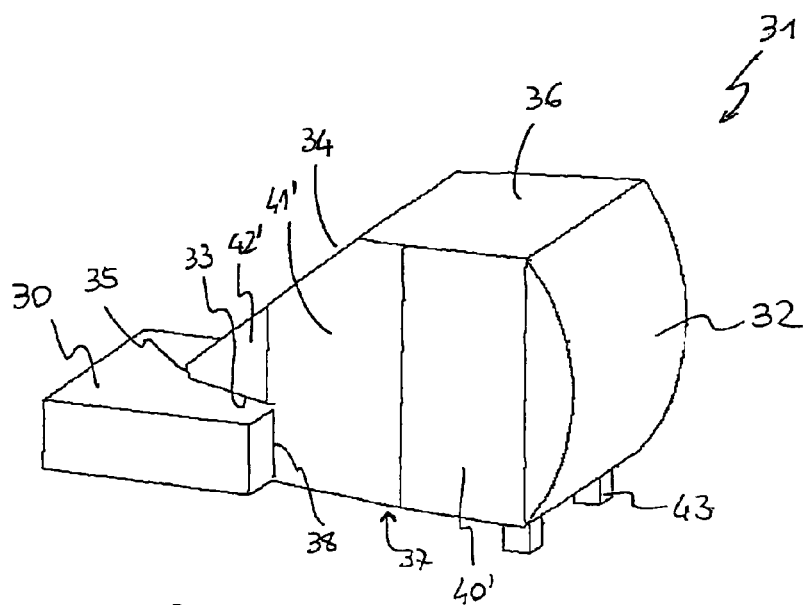
Figure 7:
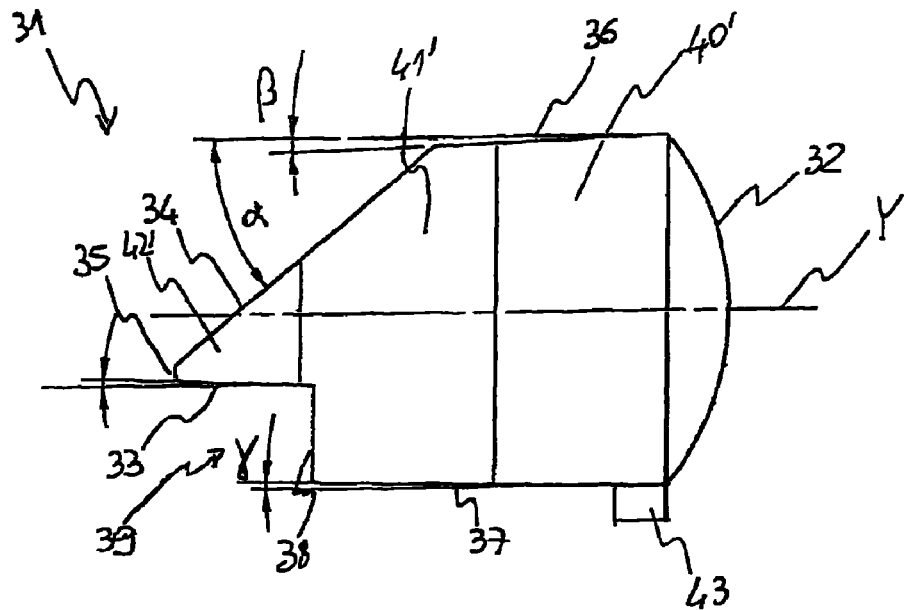
Figure 8:
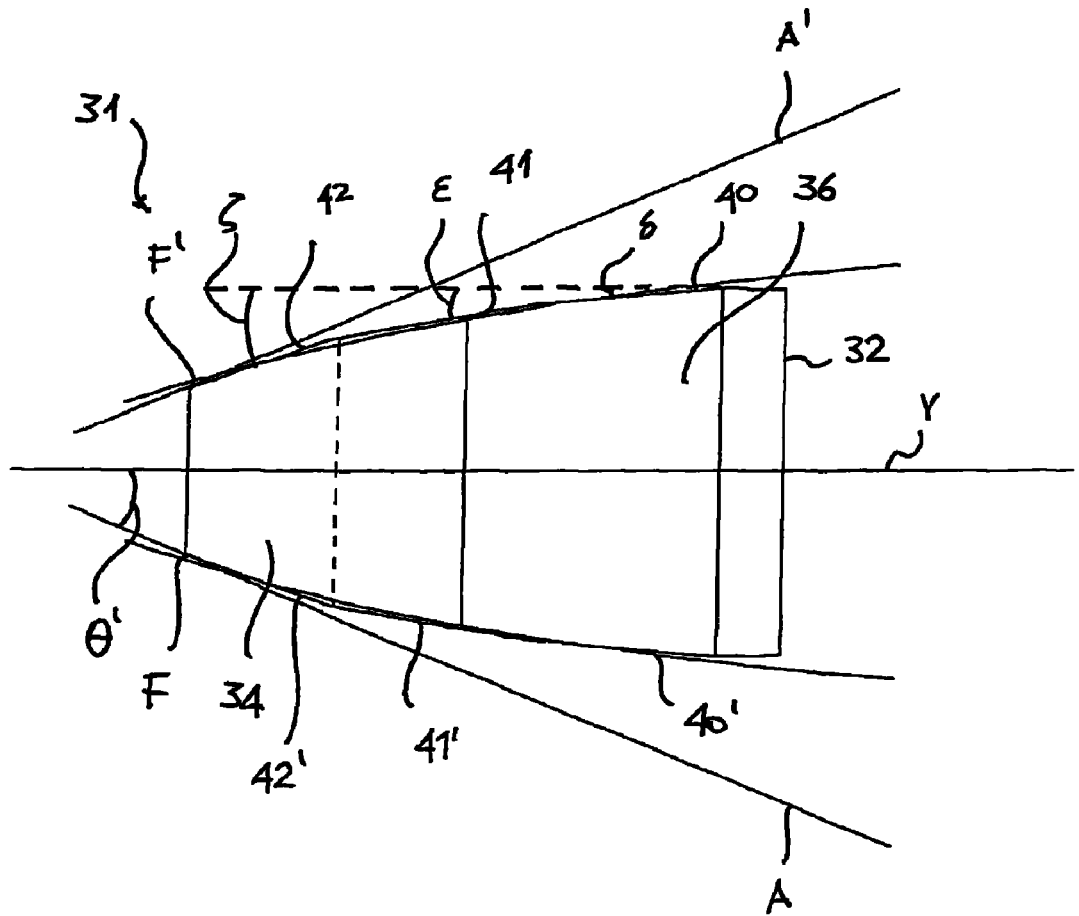
Figure 10:
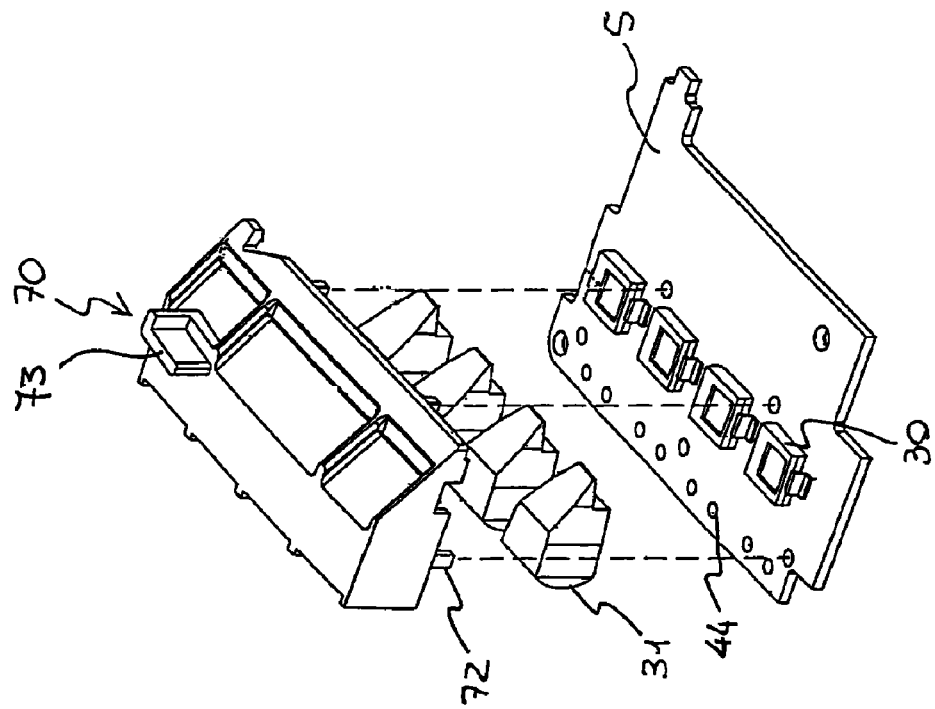
Figure 9:
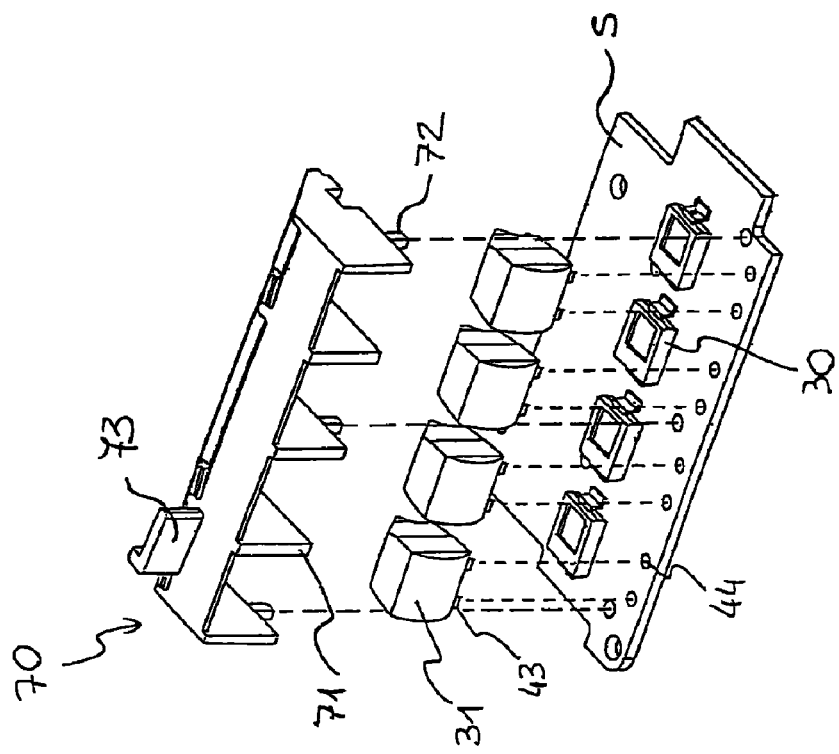
Figure 14:
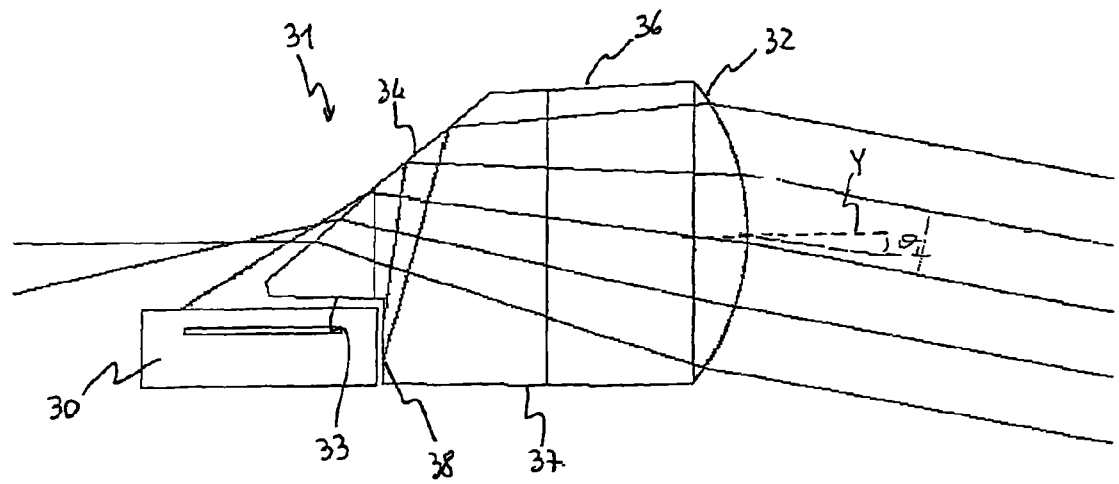
Figure 15:
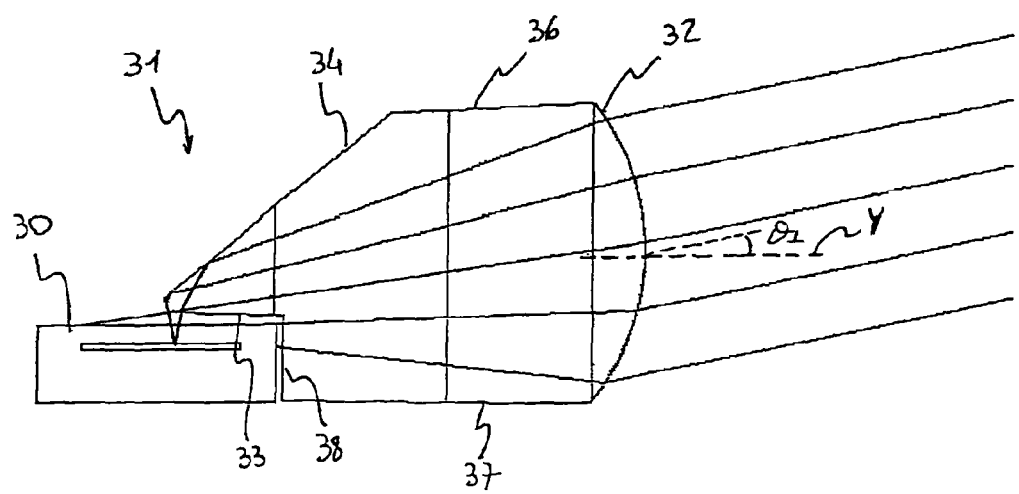
Figure 16:
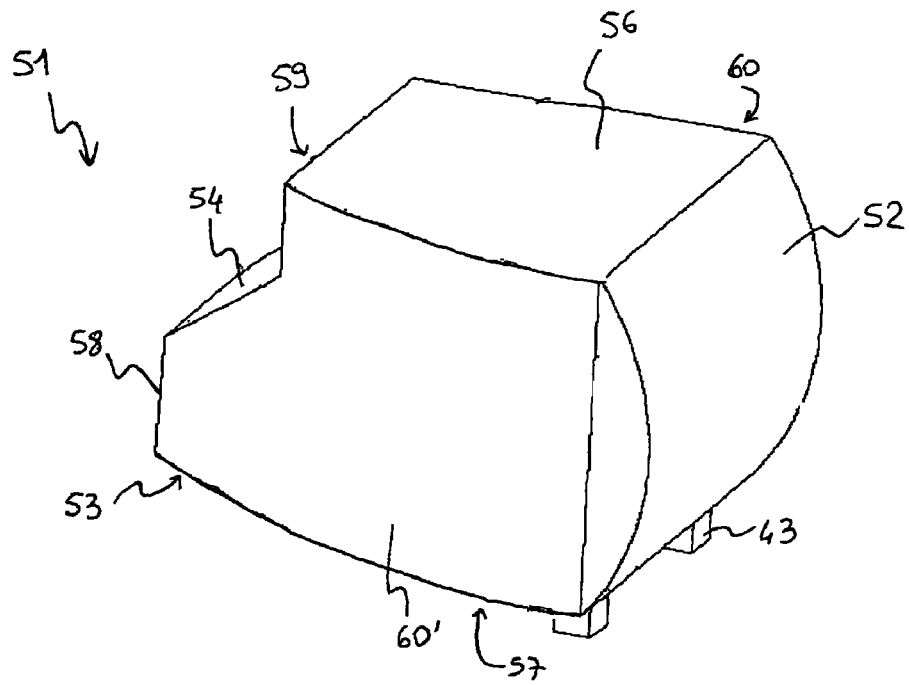
Figure 17:
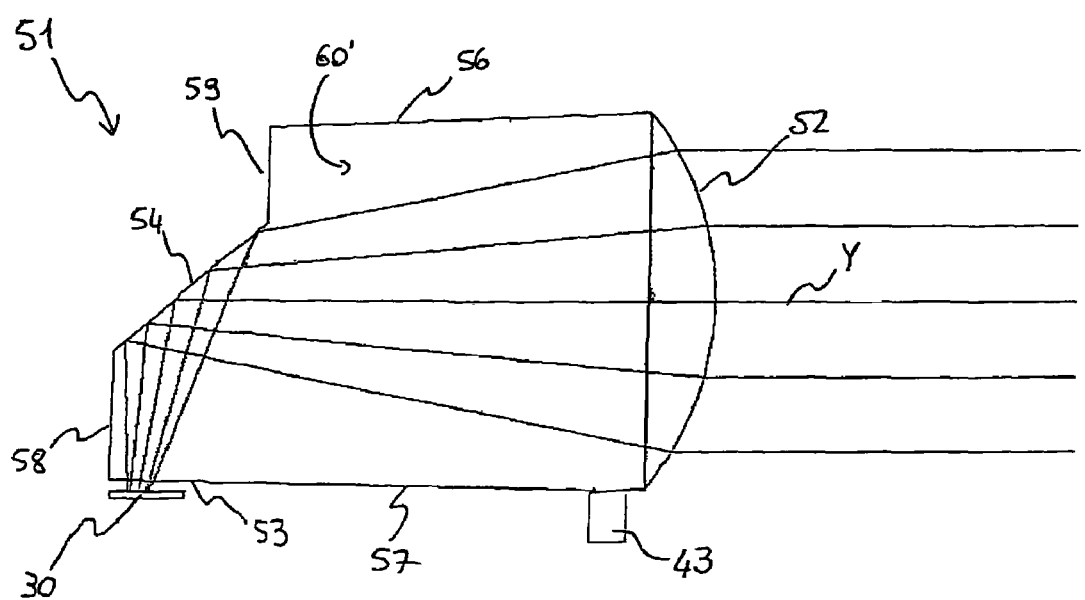
Figure 18:
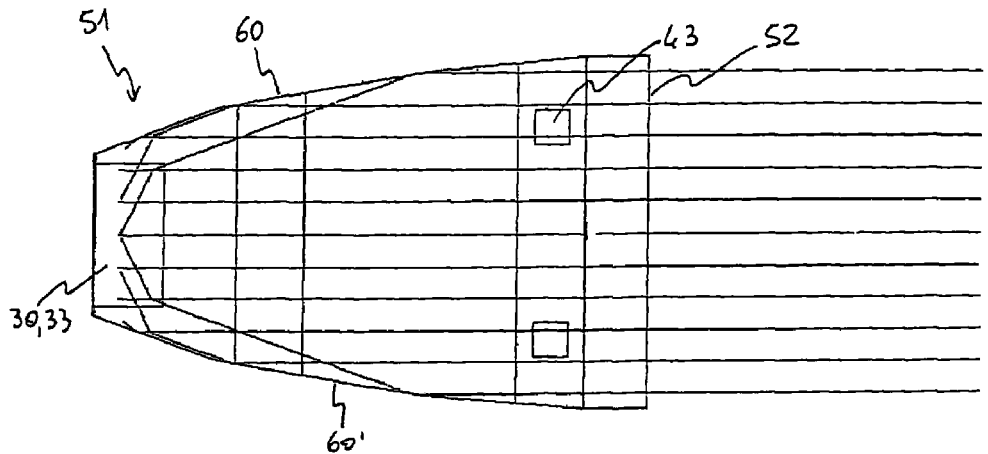
Figure 19:
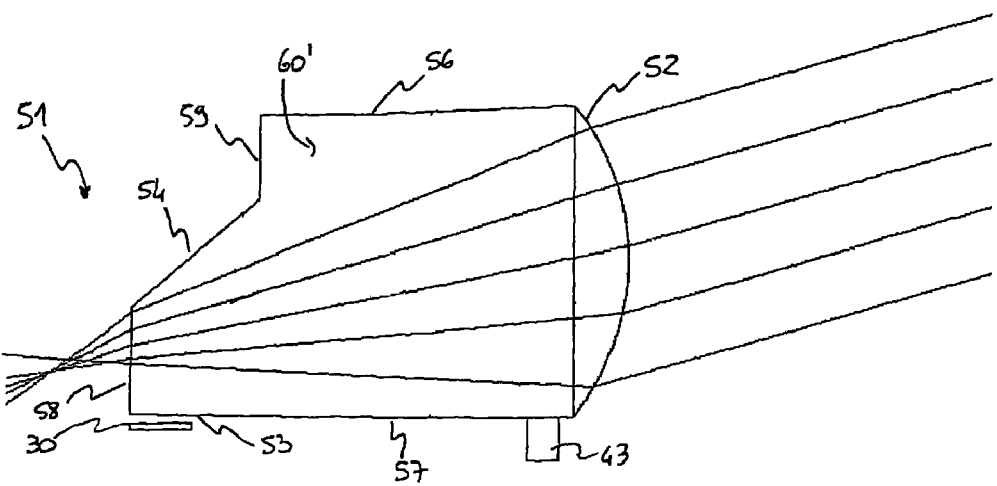
Figure 20:
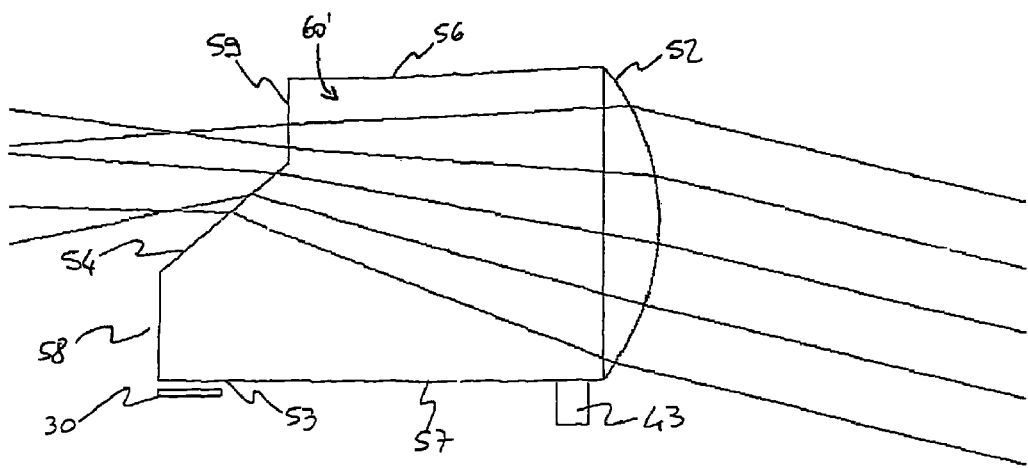
Figure 21:
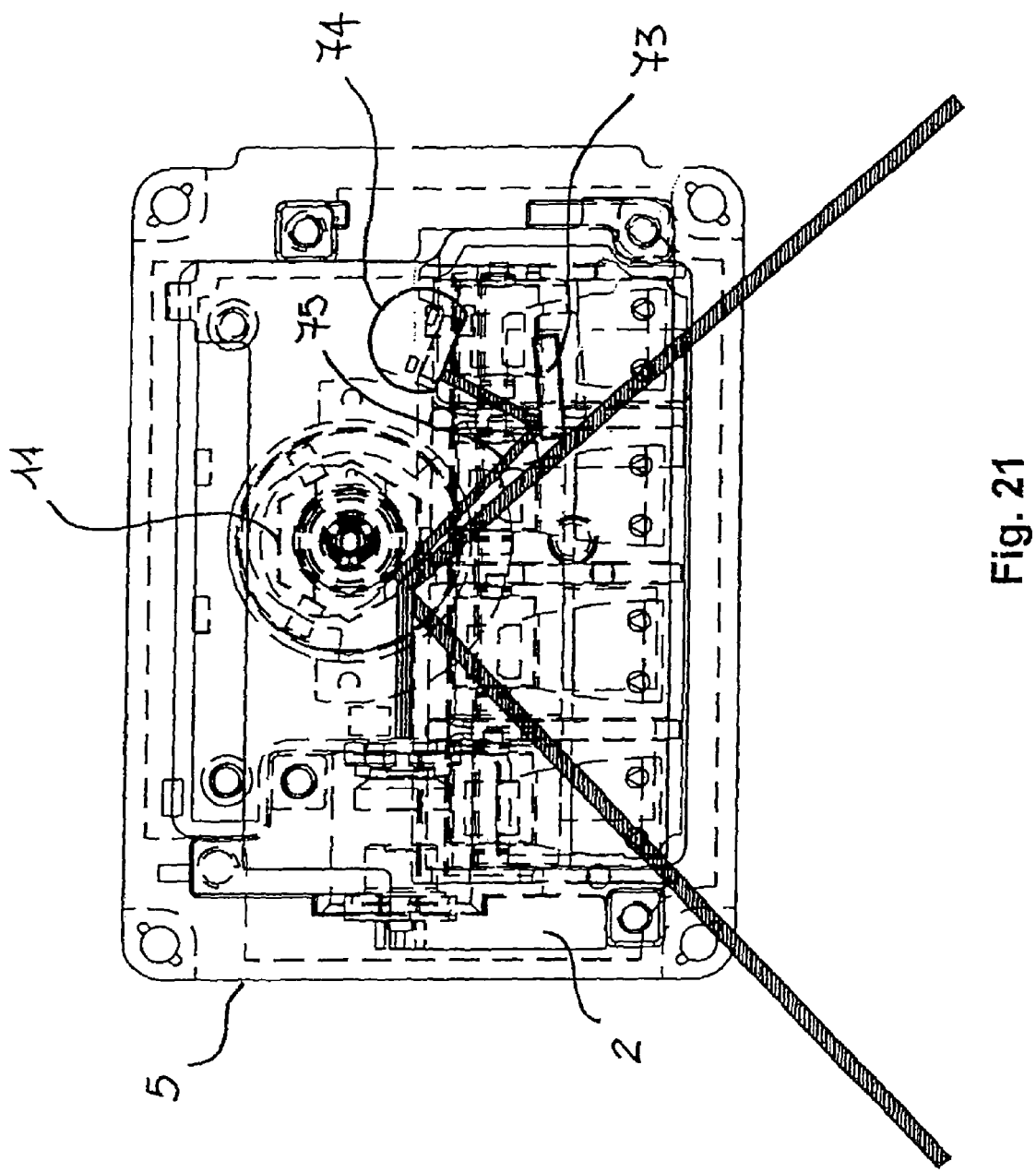
Figure 22:
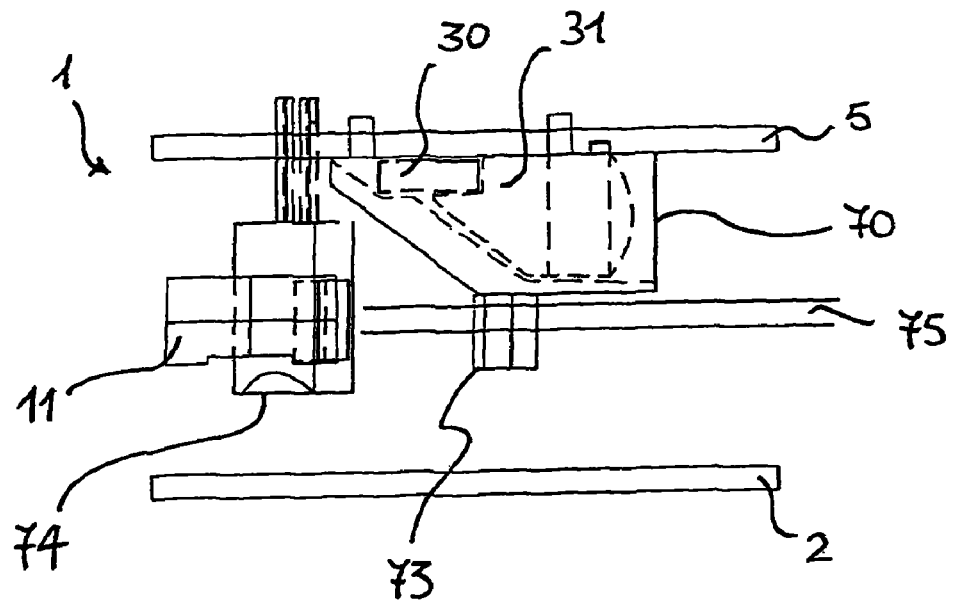
Figure 23:
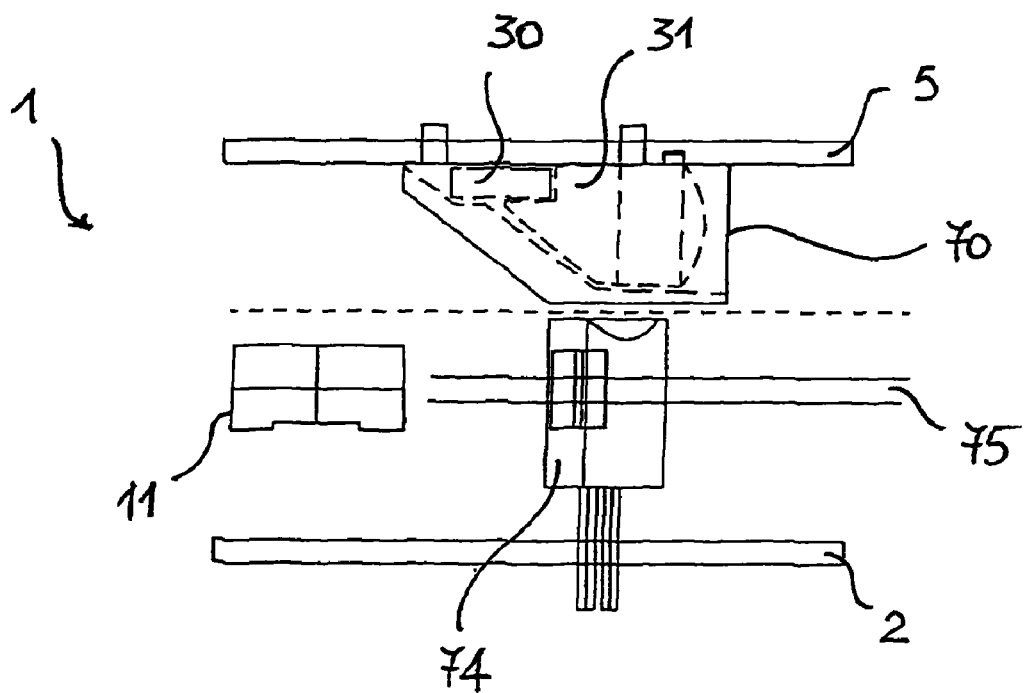

The invention shall be described more clearly hereafter with reference to some embodiments and examples, on the basis of the attached drawings, wherein corresponding elements are designated by similar references. In the drawings:

FIG. 1 illustrates a miniaturized optical code reader according to the invention, in a partially assembled state, FIG. 2 illustrates the reader of FIG. 1 in an assembled state, FIG. 3 illustrates the reader of FIG. 1 in an assembled state and with protective casing, FIG. 4 illustrates an exploded perspective view of a scanning section of the reader of FIG. 1, FIG. 5 illustrates the field of view of an optical receiving device according to the invention, in relation to a scanning line, FIG. 6 illustrates a perspective view of a first embodiment of an optical receiving device according to the invention, FIGS. 7 and 8 illustrate two perpendicular cross sections of the optical receiving device of FIG. 6, FIGS. 9 and 10 illustrate exploded perspective views of a receiving section according to the invention, FIGS. 11 to 15 illustrate the path of some light rays in the optical receiving device of FIG. 6, FIG. 16 illustrates a perspective view of a second embodiment of an optical receiving device according to the invention, FIGS. 17 to 20 illustrate the path of some light rays in the optical receiving device of FIG. 16, FIG. 21 illustrates a top view of the reader of FIG. 1, FIG. 22 illustrates a schematic side view of the reader of FIG. 1, FIG. 23 illustrates a schematic side view of a variant of the reader of FIG. 1, FIG. 24 illustrates a cross sectional view of a hollow CPC according to the prior art, and FIG. 25 illustrates a cross sectional view of a solid CPC according to the prior art.

FIGS. 1-3 illustrate a miniaturized optical code reader 1, with a size of 40 mm×30 mm×22 mm (volume of about 27 cm$^3$).

The reader 1 comprises a first PCB 2 and a second PCB of the rigid/flexible type, made up of four rigid portions or circuits 3, 4, 5, 6 connected together by three flexible connections 7, 8, 9 that allow the bending of the PCB so that the circuits 3, 4, 5, 6 are arranged at an angle (FIG. 2) and form, with the first PCB 2, four of the six faces of a rectangular parallelepiped.

On the first PCB 2 a scanning device of the laser beam emitted by a laser emitter 10 is made. The scanning device comprises a polygonal mirror 11 driven into rotation by a motor 12 and the electronics for driving the motor 12.

It should be clear that the scanning device illustrated and not further described in detail is merely exemplary. For example, the rotating polygonal mirror 11 could have the faces with different inclinations for reading stacked codes or it could be replaced by an oscillating flat mirror, or furthermore different scanning devices of the laser beam emitted by the laser emitter 10 or by a different light emitter (for example an LED) with suitable collimation optics could be used, for example a scan engine could be used.

The back circuit 3 of the second PCB is the input/output circuit (I/O) of the reader 1. The term back, like others hereafter, is used only for the purpose of easing the description and with reference to the orientation of FIGS. 1-3. The back circuit 3 of the second PCB is connected, through the flexible connection 7, to the circuit 4 of the second PCB, on the side in the assembled reader 1.

The side circuit 4 is the circuit for driving the laser emitter 8. The side circuit 4 of the second PCB is in turn connected, through the flexible connection 8, with the third circuit 5 of the second PCB, top inner in the assembled reader 1 (FIG. 2).

On the top inner circuit 5 of the second PCB a receiving section, better described hereafter, is made, comprising a plurality of photodetector devices 30, in particular photodiodes, a corresponding plurality of optical receiving devices 31 and the electronics (not shown) for driving the photodetector devices 30 and possibly for pre-processing the signal emitted by them. The back circuit I/O 3 of the second PCB is further connected, through the flexible connection 9, to the circuit 6 carrying the reading and/or decoding electronics, which in the assembled reader 1 is top outer (FIG. 2).

As can be seen more clearly in FIG. 4, the first PCB 2 is fixed to a support base 13 through screws 14 and washers 15 passing in respective holes 16 of the PCB 2. At one of the screws, the front one in FIG. 4, an elastic ring 17 is placed between the PCB 2 and the support base 13.

When, as in the illustrated embodiment, the laser emitter 10 is fixed to the support base 13 and not to the PCB 2, the elastic ring 17, by adjusting the tightness of the screw 14, allows the inclination of the PCB 2 with respect to the emission plane of the laser beam by the emitter 10 to be adjusted, allowing an optimal alignment between the rotating polygonal mirror 11 and the scanning laser ray, and between the emission plane of the laser beam and the line of view of the receiving optics formed on the top inner circuit 5 of the second PCB.

Moreover, the elastic ring 17 elastically deforms under the tightening action of the screw 14 and allows possible vibrations transmitted to the PBC 2 from the support base 13 to be absorbed at least in part.

Similar elastic rings can also be provided at the other screws 14.

The support base 13 is provided, in proximity of the four corners, with four posts 18a, 18b. More specifically, the two posts 18a arranged along a diagonal of the support base 13 are lower in height than the two posts 18b arranged along the other diagonal of the support base 13. The top inner circuit 5 of the second PCB rests on the posts 18a of lower height and is fixed there through screws 19a passing in holes 20a of the receiving circuit 5. The top outer circuit 6 of the second PCB rests on the posts 18b of higher height and is fixed there through screws 19b passing in holes 20b of the receiving circuit 5.

The first PCB 2 is connected to the second PCB, and in particular to its top outer circuit 6, through a Flat Flexible Cable (FFC) 21 which engages in suitable connectors, the connector 22 provided on the top outer circuit 6 of the second PCB being visible in FIG. 2, while the connector provided on the first PCB 2 is not visible since it is on its lower side.

A supply and signal input/output cable 23 is connected to the support base 13.

In FIG. 3 a cover 24 is shown that couples on the support base 13 to form a protective casing of the reader 1. The cover 24 is provided with an emitting/receiving window 25 that, in the assembled state of the reader 1, faces the receiving section and the emitting and scanning section, to allow the output of the laser light emitted by the emitter 10 and scanned by the rotating polygonal mirror 11 and the input of the light diffused by the optical code when illuminated by such scanned laser light. The emitting/receiving window 25 can also embody or comprise an optical long-pass filter (i.e. that allows light of long wavelengths to pass) or band-pass filter for rejection of the ambient light, for example having a pass band of 580-700 nm. In an alternative embodiment, the casing consisting of the base 13 and the cover 24 can be missing, the first PCB 2 of the reader 1 in such a case being fixed directly in any apparatus, preferably with the interposition of the elastic ring 17 as described above for protection against shocks and vibrations. In case the casing is not provided for, the laser emitter 10 and the posts 18a, 18b are fixed directly onto the first PCB 2 and the emitting/receiving window 25, as well as the possible filter, are fixed, for example by gluing, between the first PCB 2 and the top inner circuit 5 of the second PCB. It should be understood that a filter thus fixed between the first PCB 2 and the top inner circuit 5 can also be provided in case of use of the casing 13, 24, as an alternative to its arrangement at the emitting/receiving window 25.

Making the reader 1 through the two PCBs one of which can be bent as described above is advantageous since in the unassembled state, the reader 1 can be laid down flat and easily protected, packaged, stored and shipped. The flexible connections 7, 8, 9 also allow a particularly compact arrangement of the electronics around the optics of the reader 1.

It should be understood that a single PCB could also be provided, on which the emitting circuit is also made, connected through a flexible connection to the back circuit 3 or to the side circuit 4.

As shall be clear to those skilled in the art, the illustrated reader 1 is of the non-retroreflective type, the optimal configuration for miniaturized readers since it allows the size of the optical scanning device (the polygonal mirror 11 in the illustrated embodiment) to be minimized reducing it to the order of magnitude of the size of the laser spot incident on each face.

More specifically, the size of each face of the polygonal mirror 11 is typically about three times the width of the laser spot incident on it in the direction perpendicular to the axis of rotation of the polygonal mirror 11, and is about twice the width of the laser spot in the direction of the axis of rotation.

As stated, the receiving section formed on the top inner circuit 5 of the second PCB comprises a plurality of photodetector devices 30, typically photodiodes, four in the illustrated embodiment, but that can be lesser in number, even just one, or greater in number. The receiving section further comprises a corresponding plurality of optical receiving devices 31, each associated with a photodetector device 30.

By providing for a plurality of modules formed of an optical receiving device 31 and a photodetector device 30, in a number selected taking the opposing requirements of minimizing the bulk of the receiving section and of maximizing the total signal into account, it is possible to increase the amount of light diffused by the code that is overall collected by the receiving section. Therefore, an amplification at a smaller gain is sufficient, which is thus accompanied by less electrical noise.

Each optical receiving device 31 is designed to collect, onto the associated photodetector device 30, to the greatest possible extent all and only the light diffused by the optical code illuminated by the scanning line formed by the scanning device described above, in order to maximize the efficiency of the photodetector devices 30.

With reference to FIG. 5, which illustrates an optical receiving device 31/photodetector device 30 module facing a scanning line S formed by the reading light beam, for example by a laser beam, in the plane of an optical code (not shown), the optical receiving device 31 should have a field of view of low aspect ratio.

FIG. 5 illustrates the angle of the field of view in the scanning plane $\alpha_\parallel$ and the angle of the field of view in the direction perpendicular to the scanning line $\alpha_\perp$. The field of view at the plane of the optical code is a rectangle with very rounded corners, substantially an oval.

The acceptance angle in the scanning plane $\theta_\parallel$ and the acceptance angle in the direction perpendicular to the scanning line $\theta_\perp$, respectively half of the angles of the field of view, are also indicated.

In a first preferred embodiment, the optical receiving device 31, illustrated in FIG. 6 in a perspective view with an associated photodetector device 30 and in FIGS. 7 and 8 in two cross sections, respectively perpendicular and parallel to the scanning line, consists of a solid body, of a transparent material with high refractive index, for example polycarbonate (n=1, 58) or an acrylic material, typically PMMA (n=1, 49).

The body of the optical receiving device 31 is an irregular solid on which firstly a light input face 32, which in use faces the optical code to be read, a light output face 33, substantially perpendicular to the input face 32 and that in use faces and more specifically is adjacent to at least part of the light-sensitive surface of the photodetector element 30, and an oblique face 34 with respect to both the input face 32 and the output face 33, can be identified.

The light input face 32 is cylindrical, with a radius of curvature of about 4 mm, axis parallel to the scanning plane and substantially square section of a side of about 5 mm. Alternatively, the input face 32 could be flat or incorporate a Fresnel lens or a toric lens, optically equivalent to the cylindrical lens.

The oblique face 34 is inclined by an angle $\alpha$ with respect to the normal Y to the input face 32 at its centre. The angle $\alpha$ is 40° or in any case is preferably less than 45°.

The oblique face 34 is substantially adjacent to the output face 33—apart from a small joining face, indicated with reference numeral 35—while it is joined to the input face 32 through a face 36, at the top in FIGS. 6 and 7, which is also substantially perpendicular to the input face 32. The face 36 is preferably inclined by a small angle $\beta$ with respect to the normal Y, in the direction illustrated or in the opposite direction, to make it easier to extract the optical receiving device 31 from the mould when it is obtained by injection moulding. The absolute value of the angle $\beta$ can for example be between 0° and 4°.

Since as shown the output face 33 is arranged in an intermediate position with respect to the input face 32, it joins with the input face 32 through a face 37, at the bottom in FIGS. 6, 7, adjacent and substantially perpendicular to the input face 32 (apart from a small angle $\gamma$, of absolute value of about 1°) and a face 38, arranged to the bottom left-hand side in FIGS. 6 and 7, adjacent to the output face 33 and substantially parallel to the input face 32.

The output face 33 therefore is cantilever from the face 38, defining a recess 39 with it, suitable for receiving the photodetector device 30 so that the optical receiving device 31-photodetector device 30 assembly has minimum bulk.

Moreover, since the output face 33 is arranged in an intermediate position with respect to the input face 32, the projection, in a direction parallel to the normal Y, of the oblique face 34 on the input face 32 does not extend through the entire input face 32, rather only in its upper portion in FIGS. 6 and 7. The projection of the oblique face 34 in the direction perpendicular to the normal Y, on the other hand, extends beyond the light output face 33 (to the right in FIG. 7).

With reference to the cross-section of FIG. 8, in a plane parallel to the scanning line, the optical receiving device 31 also has, on each side, a first face 40, 40' adjacent to the input face 32 and inclined with respect to the normal Y to the input face 32 at its centre by an angle $\delta$ greater than 4° and preferably of about 5°; a second face 41, 41' adjacent to the first face 40, 40' and inclined with respect to the normal Y by an angle $\epsilon$ greater than 9° and preferably of about 10°; and a third face 42, 42' adjacent to the second face 41, 41' and inclined with respect to the normal Y by an angle $\zeta$ greater than 15° and preferably of about 20°. The faces 40, 41, 42 and 40', 41', 42' of the two sides of the optical receiving device 31 are overall converging.

Moreover, the cross-section in a plane parallel to the scanning line (FIG. 8) of the faces 40, 41, 42 approaches a portion of a parabola having the focus F at the edge between the oblique face 34 and the third face 42' of the opposite side, and the axis A forming with the normal Y to the input face 32 at its centre an angle $\theta'$ equal to $\sin^{-1}((\sin \theta_\parallel)/n)$, wherein $\theta_\parallel$ again represents the desired acceptance angle in the direction parallel to the scanning direction and n represents the refractive index of the transparent material of the body of the optical receiving device 31.

Similarly, the section of the faces 40', 41', 42' approaches a portion of a parabola having the focus F' at the edge between the oblique face 34 and the third face 42 of the opposite side, and the axis A' equally inclined with respect to the normal Y.

The number of faces with progressive inclination can also be just two, or else more than three to better approach the parabolic progression described above. Of course, it is also possible to provide for two individual curved faces, with parabolic progression.

The optical receiving device 31 further comprises a pair of integrally formed pins 43, allowing to be fixed in a predetermined position at respective holes 44 (FIGS. 9 and 10) in the top inner receiving circuit 5 of the second PCB of the reader 1, or at a different support surface.

The provision of such pins 43—or corresponding assembly elements, such as grooves, fins or similar—, as well as the provision of the recess 39, aids the correct alignment of the output face 33 of the optical receiving device 31 with the sensitive surface of the photodetector device 30 when the pins 43 are inserted in the PCB on which the photodetector device 30 is already made or assembled.

The two devices 30, 31 can also be joined together through an adhesive of the index matching type. This is a very liquid and highly transparent adhesive that is applied onto the photoreceiver 30; once the optical receiving device 31 has been applied, the adhesive is let to set or is set through an ultraviolet (UV) lamp. The adhesive has a refractive index substantially equal to that of the material constituting the optical receiving device 31 and to that of the package of the photodetector device 30, typically made of PMMA. In this way reflections (Fresnel reflections) are avoided that would be present at the passage of light from the material of the optical receiving device 31 to air and then at the passage from the air to the material of the photodetector device 30 because of the different refractive index of air. Such reflections would have an order of magnitude of about 4% at each passage, corresponding to a total loss of about 8%. By providing for the index matching adhesive, such a percentage of signal is recovered.

As stated, the shape of the optical receiving device 31 is such that it can be easily obtained through injection moulding. At the input and oblique faces 32 and 34, the finish is preferably of an optical quality (optically polished) with roughness of less than 2 µm, while at the output face 33 a high quality finish (high polished) with roughness of less than 10 µm is sufficient.

The operation of the optical receiving device 31 having the geometry described above is as follows.

Figure 11:
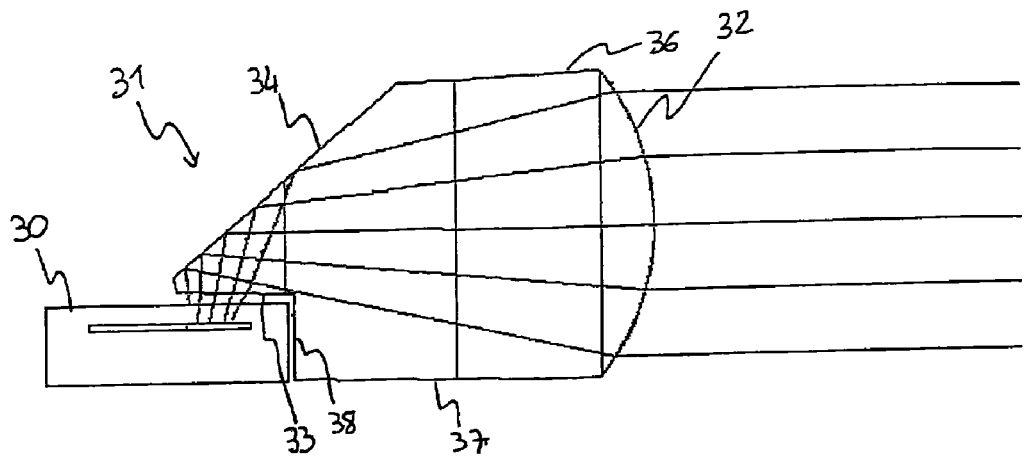

With reference to FIG. 11, the light input face 32 embodies a cylindrical lens, concentrating the light diffused by the optical code in the direction perpendicular to the scanning line (i.e. along the bars and the spaces in case the scanning line perpendicularly crosses a barcode) making it converge towards the normal Y to the input face 32 onto the oblique face 34.

The oblique face 34 deflects such light towards the output face 33—and therefore onto the photodetector device 30—by total internal reflection. Indeed, thanks to the angle of inclination α of 40°-45° of the oblique face 34, the angle that the light coming directly from the optical code, and therefore parallel to the normal Y, forms with the oblique face 34 is always greater than its critical angle $\theta_c = \sin^{-1}(1/n)$. The critical angle $\theta_c$ is about 39° in the case of polycarbonate (n=1,58) and about 42° in the case of PMMA (n=1,49) with respect to the normal to the oblique face 34.

The values indicated above of the angle α of inclination of the oblique face 34 are suitable also considering the inclination of such light rays within the optical receiving device 31 due to the convergence caused by the lens embodied at the input face 32, which reduces the angle of the light with respect to the perpendicular to the oblique face 34 in the lower portion (with reference to the orientation of FIG. 11) of the optical receiving device 31.

Figure 12:
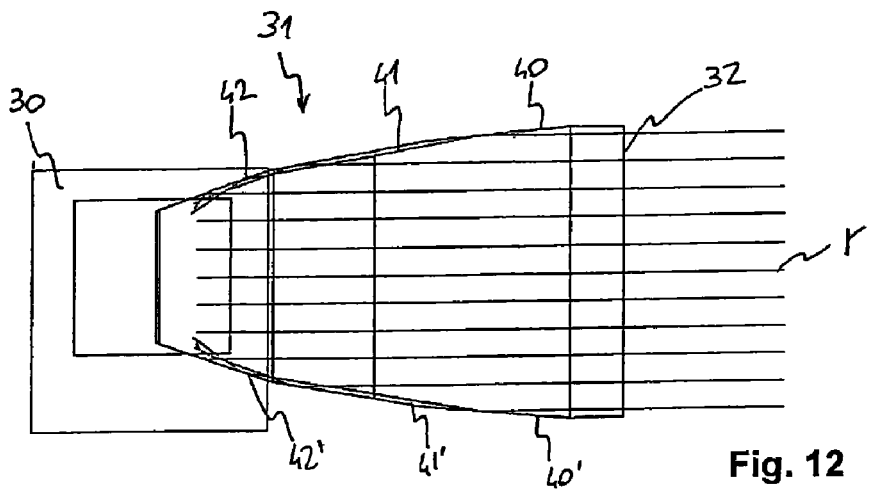
Figure 13:
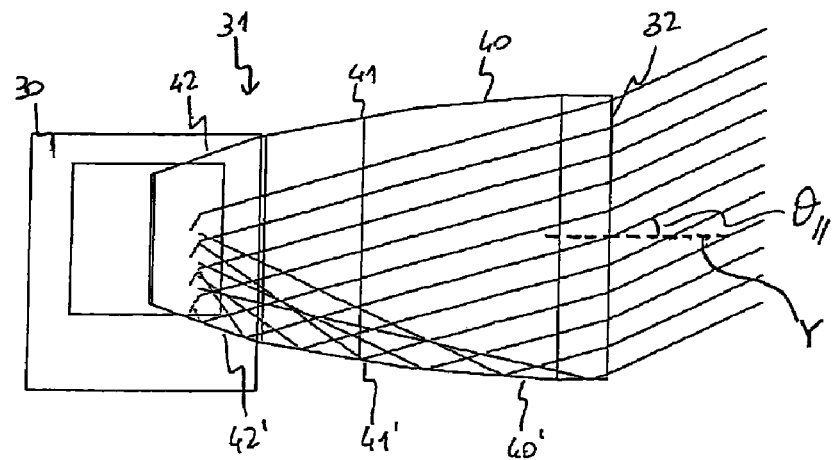

Moreover, with reference to FIGS. 12 and 13, the faces 40, 41, 42 and 40', 41', 42' at the two sides of the scanning line, approaching a portion of parabola as described above, also concentrate the light at the oblique face 34, which again deflects it at the output face 33 and therefore onto the photodetector device 30. This also occurs in case the light is incident on the input face 32 at an angle close to the acceptance angle in the direction parallel to the scanning line $\theta_{\|}$ (FIG. 13).

With reference to FIGS. 14 and 15, the light that is incident on the input face 32 outside of the acceptance angle in the direction perpendicular to the scanning line $\theta_\perp$, which represents ambient light or noise, on the other hand, does not reach the output face 33 and therefore is not detected by the photodetector device 30.

Indeed, such light is either focused by the input face 32 onto the oblique face 34, but from this deflected onto the joining face 38 forming the recess 39 (top rays in FIG. 14), or focused by the input face 32 onto the oblique face 34, but with an angle less than the critical angle $\theta_c$ and therefore transmitted from it outside of the optical receiving device 31 instead of being totally internally reflected (bottom rays in FIG. 14), or focused by the input face 32 directly onto the joining face 38 (bottom rays in FIG. 15) or in any case deviated so as not to end on the sensitive surface of the photodetector device 30 (intermediate rays in FIG. 15), or at most a minimal portion will (top rays in FIG. 15).

Summarising, the optical receiving device 31 described above exploits the TIR properties and embodies a concentrator of the light that is incident on the input face 32 within the desired field of view onto the output face 33, having a particularly high efficiency. Also thanks to the fact that it is made through a solid body of a transparent material, the concentration ratio is high, greater than a hollow concentrator with reflective walls.

It is therefore possible to use a photodetector device 30 of reduced sensitive area, with consequent high pass band of the receiving circuit and ability to read optical codes at high speed.

More specifically, the optical receiving device corresponding to the preferred embodiment detailed above, thanks to the presence of the side surfaces 40, 41, 42 and 40', 41', 42' with overall approximately parabolic progression, has a collection efficiency of the light incident substantially normal onto the input face 32 of over 80%, a collection efficiency of the light incident on the input face 32 in the scanning plane at angles less than 25° of over 70% and a collection efficiency of the light incident on the input face 32 in the scanning plane at angles greater than 25° of substantially zero. In other words, the acceptance angle in the scanning direction $\theta_{\|}$ is about 25°.

In the direction perpendicular to the scanning plane, the acceptance angle $\theta_\perp$ is sufficiently low, the light transmission curve from the input face 32 to the output face 33 in such a direction having a FWHM (Full Width at Half Maximum) of about 6°, both thanks to the presence of the cylindrical lens integrally made on the input face 32, and thanks to the presence of the oblique face 34 and of the joining face 38 forming the recess 39.

The overall concentration factor of the optical receiving device 31 has been measured at about 20:1, therefore allowing the use of a particularly small photodetector element 30, with a consequent large pass band of the receiving circuit and therefore high-speed optical code reading capability.

FIG. 16 illustrates a second embodiment of the optical receiving device 51, the parts of which that are analogous to those of the optical receiving device 31 are indicated with analogous reference numerals, increased by 20.

The optical receiving device 51 differs from the first embodiment described above in that the output face is arranged substantially at level with an end (lower in FIG. 16) of the input face 32, to which it is joined through a face 57, lower in FIG. 16. The joining face 57 and the upper face 56 can also have a slight inclination to make it easier to extract the optical receiving device 53 from the mould.

Should the mutual inclination between the output face 53 and the joining face 57 be zero, they shall be geometrically indistinguishable, apart from the possible different surface finish, and a light output window 53 shall be more properly identifiable in a portion of a face of the optical receiving device.

Also in this embodiment, the projection of the oblique face 54 on the input face 52 again corresponds to a portion of the latter, more specifically to an intermediate portion, and the projection of the oblique face 54 extends beyond the output face 53.

The oblique face 54 joins with the output face 53 through a face 58 substantially parallel to the input face 52, and with the input face 52 not only through a face 56 substantially perpendicular to the input face 52, but also through a face 59 substantially parallel to the input face 52.

Unlike the first embodiment, the recess 39 is therefore not created and indeed the optical receiving device 51 is suitable for coupling with a very thin photodetector device 30, or one that is recessed into the receiving circuit 5 of the second PCB of the reader 1 or into another support of the receiving section.

Moreover, the side faces 40, 41, 42 and 40', 41', 42' are replaced by just two faces 60, 60' with parabolic section, it being understood that approaching faces can also be provided for in this embodiment.

With reference to FIGS. 17-20, it should be understood that the operation and the performance of the optical receiving device 51 are totally similar to those of the optical receiving device 31, the light that is incident on the input face 52 within the desired field of view (FIGS. 17, 18) being concentrated onto the oblique face 54 and deflected onto the output face or window 53, and the light that is incident on the input face 52 outside of the desired field of view (FIGS. 19, 20) being transmitted outside of the optical receiving device 51 through the joining faces 58 and 59 or the oblique face 54 itself, since it is incident there with an angle less than its critical angle $\theta_c$.

Again with reference to FIGS. 9 and 10 a screen 70 is illustrated associated with the optical receiving device 31 (51), and more specifically with a plurality of such optical receiving devices 31 (51), to screen them and the photodetector devices 31 (51) from ambient light that could otherwise be incident directly on the faces other than the input face 32 (52) and from the light emitted by the emitter and by the scanning device.

In such a way the S/N ratio of the associated photodetector device 31 (51) is increased, and the occurrence of an undesired increase in the field of view of the photodetector device 31 (51) is avoided, especially in the case of close-up reading of the optical code.

The screen 70 is made of plastic or thin opaque, for example black or anodised, metal sheet. When the screen 70 is metallic, it can advantageously be welded directly to the top inner circuit 5 of the second PCB of the reader 1, thus minimizing the bulk and the cost of the receiving section.

The screen 70 comprises a plurality of walls 71 extending between pairs of adjacent optical receiving devices 31 (51), to screen them from each other.

In order to preserve the operation of the optical receiving device 31 (51) based on total internal reflection, the screen 70 should be kept spaced from the optical receiving device(s) 31 (51).

In order to make it easier to assemble the screen 70 on the top inner circuit 5 and to ensure such a spaced relationship, the screen is provided with pins 72 or other analogous positioning and assembly elements, such as projections, fins or grooves.

Moreover, the side walls of the screen 70 could extend beyond the optical receiving devices 31, so as to create a housing to fix an optical band-pass or long-pass filter there, for example through gluing.

On the screen 70 a flat mirror 73 is also advantageously arranged that cooperates with the polygonal mirror 11 and with a sensor 74 arranged on the top inner circuit 5 of the second PCB (FIG. 1) behind the optical receiving device 31/photodetector device 30 modules to provide a signal representative of the passage between two successive scanning lines, the so-called scan signal. In greater detail and with reference to FIG. 21, when the laser spot emitted by the laser emitter 10 approaches an edge between two adjacent faces of the polygonal mirror 11, the deflected beam 75 would not be useful for the purposes of the scanning line since the polygonal mirror 11, at the edges, does not have the necessary optical flatness. The deflected beam 75 is thus exploited to generate the scan signal, making it incident on the mirror 73 that deflects it onto the sensor 74.

The above described arrangement allows the size of the reader 1 to be reduced in the direction perpendicular to the scanning line. Indeed, as can be seen in FIG. 22, which diagrammatically represents the reader 1 in a side view, the sensor 74 projects inside the reader 1 down to about at level with the polygonal mirror 11. There is therefore a partial interpenetration of the scanning section and the receiving section.

FIG. 23 illustrates a less advantageous variant to obtain the scan signal. According to such a variant, conventionally the sensor 74 is arranged in the scanning section, facing the rotating polygonal mirror 11 and no deflecting mirror is provided for. It should be noted that in such a case, the size of the reader 1 is substantially larger since the optical receiving device 31/photodetector device 30 modules must remain beyond (above in FIG. 23) the bulk of the sensor 74. Although the optical receiving element 31, 51 and the related receiving section have been described with reference to the miniaturized optical code reader of FIGS. 1-3, it should be understood that they can be advantageously used in optical code readers of other types and configurations.

On the other hand, it should be understood that the preferred embodiment of reader described above has other per sé innovative aspects, including its configuration through two PCBs one of which can be bent, its capability of being fixed with alignment adjustment through elastic rings, and the arrangement of the scan signal detection elements (mirror and sensor) in a spatially intermediate position between the receiving section and the scanning section.

It should be understood that with the reader 1 of the invention not only linear codes, in particular barcodes and stacked codes (for example PDF 417), but also two-dimensional codes, including characters, can be read by providing for a second scanning mechanism in the direction perpendicular to the scanning line to form a raster of scanning lines, for example a different inclination of the faces of the polygonal mirror 11, a second oscillating mirror or a relative movement between reader 1 and optical code, like for example in the case of optical codes carried by objects in movement on a conveyor belt, since the extension of the raster pattern in any case falls within the field of view of the optical receiving devices 31.

The invention claimed is:

1. Optical receiving device for an optical code reader, comprising a solid body, of a transparent material, having a light input face, a light output face for coupling with a photodetector device, said output face being substantially perpendicular to said input face, and an oblique face with respect to both said input face and said output face, wherein the mutual orientation of the faces of the optical receiving device is such as to concentrate onto said output face by total internal reflection light entering from said input face within an acceptance angle in the direction of the scanning line and a smaller acceptance angle in the direction perpendicular to the scanning line.

2. Optical receiving device according to claim 1, wherein the optical receiving device has an acceptance angle in the direction of the scanning line much greater than the acceptance angle in the direction perpendicular to the scanning line.

3. Optical receiving device according to claim 1, wherein the input face is rectangular or square.

4. Optical receiving device according to claim 1, wherein a focusing lens is integrally made at the input face.

5. Optical receiving device according to claim 4, wherein said lens is selected from a cylindrical lens, a Fresnel lens or a toric lens.

6. Optical receiving device according to claim 1, wherein the transparent material is polycarbonate or an acrylic material.

7. Optical receiving device according to claim 1, wherein positioning and assembly elements of the optical receiving device are integrally made in the solid body.

8. Optical receiving device according to claim 1, wherein the optical receiving device comprises two side faces, the section in a plane substantially parallel to the output face of each of the side faces being a portion of parabola.

9. Optical receiving device according to claim 1, wherein the optical receiving device comprises a plurality of flat faces on each side, arranged so as to approach two side faces, the section in a plane substantially parallel to the output face of each of said approaching side faces being a portion of parabola.

10. Optical receiving device according to claim 9, wherein the body of the optical receiving device comprises a first pair of faces adjacent to the input face and inclined with respect to the normal (Y) to the input face by an angle greater than 4°, a second pair of faces, adjacent to the first pair of faces and inclined with respect to said normal (Y) by an angle greater than 9°, and a third pair of faces adjacent to the second pair of faces and inclined with respect to said normal (Y) by an angle greater than 15°.

11. Optical receiving device according to claim 1, wherein the body of the optical receiving device further comprises a face substantially opposite the output face arranged between said input face and said oblique face.

12. Optical receiving device according to claim 8, wherein the axis (A, A') of each of said portions of parabola is inclined with respect to the normal (Y) to the input face by an angle $\theta'=\sin-1((\sin \theta_{\parallel})/n)$, wherein $\theta_{\parallel}$ represents the desired light acceptance angle in the scanning direction and n the refractive index of said transparent material, and the focus (F, F') of each of said portions of parabola is at the edge of the opposite side face, on the opposite side to the input face.

13. Optical receiving device according to claim 1, wherein the inclination of said oblique face with respect to said output face is less than 45°.

14. Optical receiving device according to claim 1, wherein the projection of said oblique face on said input face extends, in the direction perpendicular to the output face, only for a portion of said input face.

15. Optical receiving device according to claim 1, wherein the projection of said oblique face on said output face extends, in the direction perpendicular to the input face, beyond said output face.

16. Optical receiving device according to claim 1, wherein said output face is cantilever from a face parallel to said input face.

17. Optical receiving device according to claim 1, wherein the output face is at level with an end of the input face.

18. Optical receiving device according to claim 1, wherein the transparent material is coloured.

19. Optical receiving device according to claim 1, wherein said body is obtained through injection moulding.

20. Receiving section of an optical code reader, comprising at least one optical receiving device according to claim 1, associated with a photodetector device at the output face.

21. Receiving section according to claim 20, wherein said optical receiving device and said photodetector device are joined through an index matching adhesive.

22. Receiving section according to claim 20, wherein the receiving section comprises a plurality of optical receiving devices, each associated with a photodetector device.

23. Receiving section according to claim 20, wherein the optical receiving section comprises a screen of said at least one optical receiving device.

24. Receiving section according to claim 23, further comprising a plurality of optical receiving devices, each associated with a photodetector device, wherein the screen is common to said plurality of optical receiving devices.

25. Receiving section according to claim 24, wherein the screen comprises walls extending between pairs of adjacent optical receiving devices.

26. Receiving section according to claim 23, wherein said screen is spaced from said at least one optical receiving device.

27. Receiving section according to claim 23, wherein positioning and assembly elements of the screen are integrally made in the screen.

28. Receiving section according to claim 23, wherein said screen extends beyond the input face of said at least one optical receiving device to house a filter.

29. Receiving section according to claim 23, wherein the screen is made of a plastic material.

30. Receiving section according to claim 23, wherein the screen carries a mirror deflecting a non-useful scanning portion representative of the passage between two successive scanning lines onto an associated sensor.

31. Receiving section according to claim 23, wherein the screen carries a sensor of a non-useful scanning portion representative of the passage between two successive scanning lines.

32. Optical code reader comprising at least one optical receiving element according to claim 1.

33. Optical code reader comprising a receiving section according to claim 30, wherein said mirror projects into a scanning section of the reader.

34. Optical receiving device according to claim 9, wherein the axis (A, A') of each of said portions of parabola is inclined with respect to the normal (Y) to the input face by an angle $\theta'=\sin-1((\sin \theta_{\parallel}/n)$, wherein $\theta_{\lambda}$ represents the desired light acceptance angle in the scanning direction and n the refractive index of said transparent material, and the focus (F, F') of each of said portions of parabola is at the edge of the opposite side face, on the opposite side to the input face.

35. Receiving section according to claim 27, wherein the screen carries a mirror deflecting a non-useful scanning portion representative of the passage between two successive scanning lines onto an associated sensor.

36. Receiving section according to claim 27, wherein the screen carries a sensor of a non-useful scanning portion representative of the passage between two successive scanning lines.

37. Receiving section according to claim 27, wherein the screen is made of a plastic material.

38. Receiving section according to claim 27, wherein said screen extends beyond the input face of said at least one optical receiving device to house a filter.

* * * * *